United States Patent [19]

Masten et al.

[11] Patent Number: 5,317,523
[45] Date of Patent: May 31, 1994

[54] INTEGRATED REFLECTIVE IMAGE SENSOR

[75] Inventors: Billy R. Masten, Shallowater; Lester L. Hodson, McKenny, both of Tex.

[73] Assignee: Texas Instruments Incorporated, Dallas, Tex.

[21] Appl. No.: 600,060

[22] Filed: Oct. 18, 1990

[51] Int. Cl.⁵ .................................... G06F 15/20
[52] U.S. Cl. ............................ 364/525; 250/227.11
[58] Field of Search ........................ 364/525, 581; 250/227.11, 237 G; 359/117; 382/61, 65

[56] References Cited

U.S. PATENT DOCUMENTS

| | | | |
|---|---|---|---|
| 4,114,035 | 9/1978 | Herzog | 250/227.11 |
| 4,543,558 | 9/1985 | White | 356/229 |
| 4,616,266 | 10/1986 | Hennig | 382/65 |
| 4,809,194 | 2/1989 | Crookshanks | 364/581 |
| 4,847,489 | 7/1989 | Dietrich | 250/237 G |
| 4,959,809 | 9/1990 | Rogers et al. | 364/581 |
| 4,999,791 | 3/1991 | Schumann | 364/525 |
| 5,081,597 | 1/1992 | Kowalski | 364/581 |

Primary Examiner—Jack B. Harvey
Assistant Examiner—Ellis B. Ramirez
Attorney, Agent, or Firm—Wade James Brady; Richard L. Donaldson

[57] ABSTRACT

An array of light sensors is integrated with a circuit to control the selection of each light selector and to digitized the amplitude of the light impinging on each sensor. Each light sensor is addressable by an external microprocessor.

26 Claims, 3 Drawing Sheets

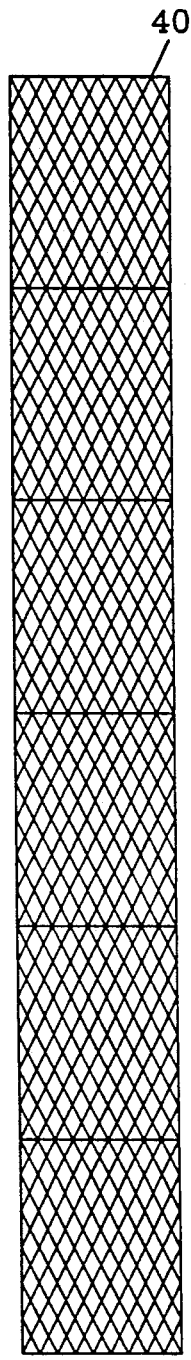
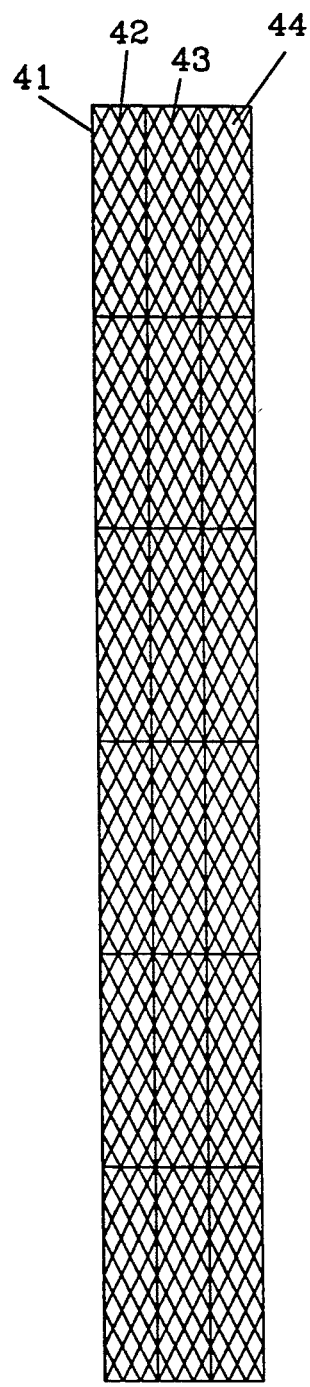
FIGURE 3   FIGURE 4   FIGURE 5

INTEGRATED REFLECTIVE IMAGE SENSOR

This invention relates to image sensors, and more particularly to the integration of an image sensor array, an analog-to-digital converter, a digital to analog converter, and a microprocessor controlled communications function such that an external microprocessor can access any light sense element in the image sensor.

BACKGROUND OF THE INVENTION

The application and use of imaging technology falls into two categories. The first and most widely used is the generation of a set of analog signals by the image, and the treatment of these signals by analog means to generate signals compatible with the requirements of the standard television monitor so that the image may be transported and reproduced in another location or time. It is very difficult to identify and measure a particular element of the array because of the serial output organization of the information.

The second category is in applications such as infrared guidance systems with technology such as described in "CCD ANALOG ARRAY PROCESSOR" by Hoschette, Joseph, Roberts, Hanzal and Schwanebeck (0547-3578/84/0000-0228 IEEE), and similar systems which require a mathematical treatment of the information to acquire time rate of change or image enhancements such as edge detection or rate of change with respect to position. Computer based systems such as Dimension also address this category. However, these systems are on the fringe of the category in terms of performance requirements and are expensive and complex. Thus their applicability to needs such as position sensing and motion sensing for machine control of a smaller scope is limited.

Image sensing devices such as CCD imagers and vidicon tubes have been exploited primarily for applications of sensing optical images of objects and producing electrical signals which can be transmitted to a distant location, or recorded for future display. In both cases, the television monitor is the typical display tool, and the eye the intended destination. Thus most of these device types are convenient to use for video applications and require considerable effort and expense if the destination is a microprocessor computer rather than the eye, and the application machine control rather than video. For machine control applications, and for many vision orientation applications which require less speed or fewer frames per second, or for image manipuations, such as differences which allows for measurements of time rate of change, and rate of change with respect to position or if a small portion of the screen is of interest, a device such as the present invention is of significant value.

SUMMARY OF THE INVENTION

The invention is to a system for direct addressing of image sensor regions, and detecting the light intensity of specific light sensing elements. A microprocessor or other digital computing device selects one light sensing element at a time, senses the light intensity on the element, producing a voltage signal, amplifies the signal, and presents it to an Analog-to-digital converter. The digitized signal may then be sent in either parallel or serial mode. The information contained in the digitized signals may be used for such functions as bar character recognition, bar code reading, edge detection, motion detection, limited view image enhancement, small area optical inspection, robotics control, displacement detection, pressure sensing, stress measurement, optical spectroscopy, and other machine control or mechanical position monitoring functions.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 3 illustrates an image area;

FIG. 4 illustrates sensor having each sensor split into three detectors; and

FIG. 5 illustrates each detector in the group of three having a differed color filter.

DESCRIPTION OF PREFERRED EMBODIMENT OF THE INVENTION

Figure 1:
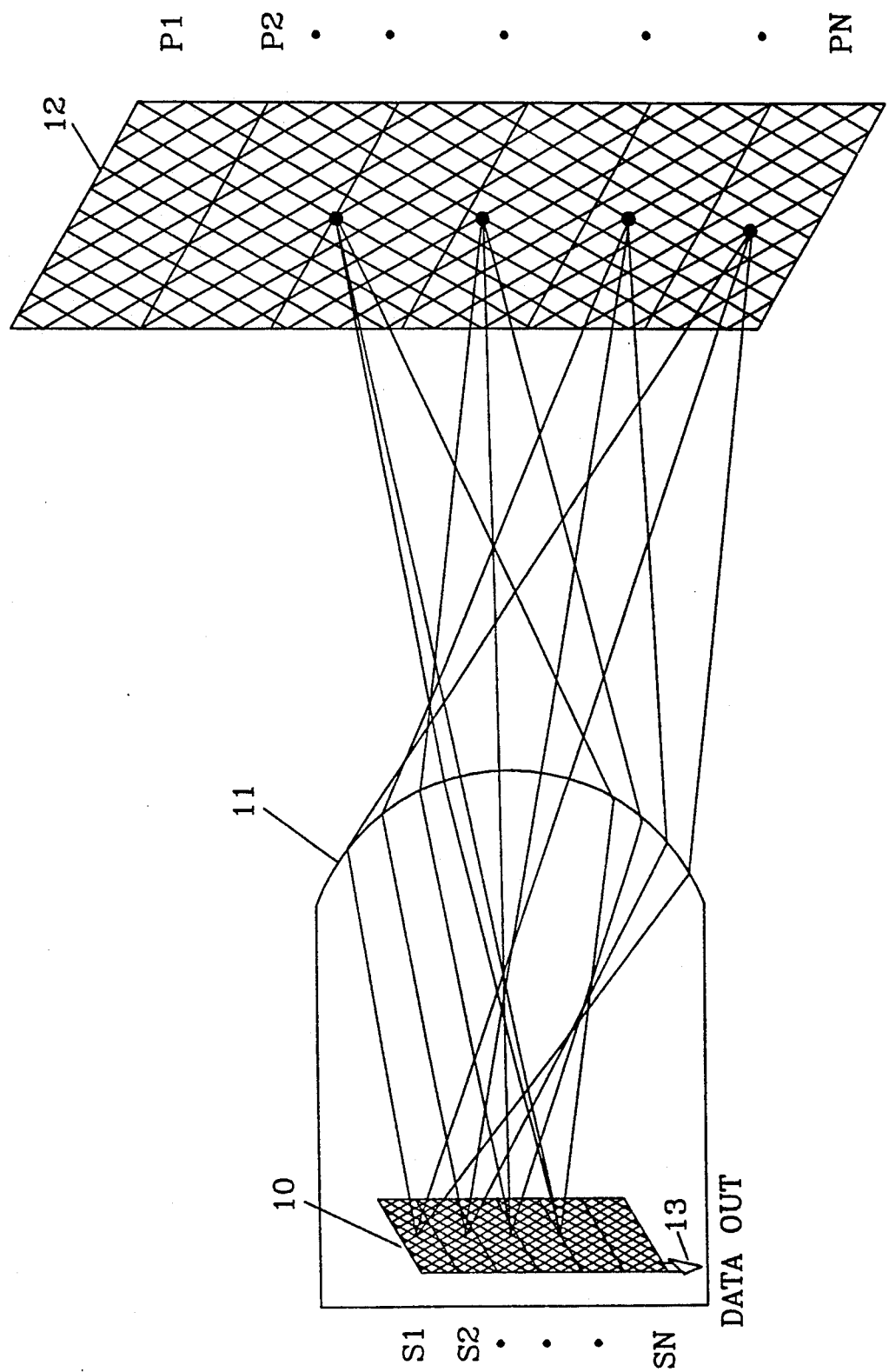
FIG. 1 illustrates a target and integrated Light Sensor Array.

FIG. 1 illustrates an image area 12 divided into picture elements $P_1$ through $P_N$. Each picture element is detected by sensor 10 with a corresponding sensor element $S_1$ through $S_N$. Lens 11 focuses the image onto sensor 10. The signal generated by the light impinging on each sensor element $S_1$ to $S_N$ is connected to a respective amplifier (FIG. 2) via connection 13.

Figure 2:
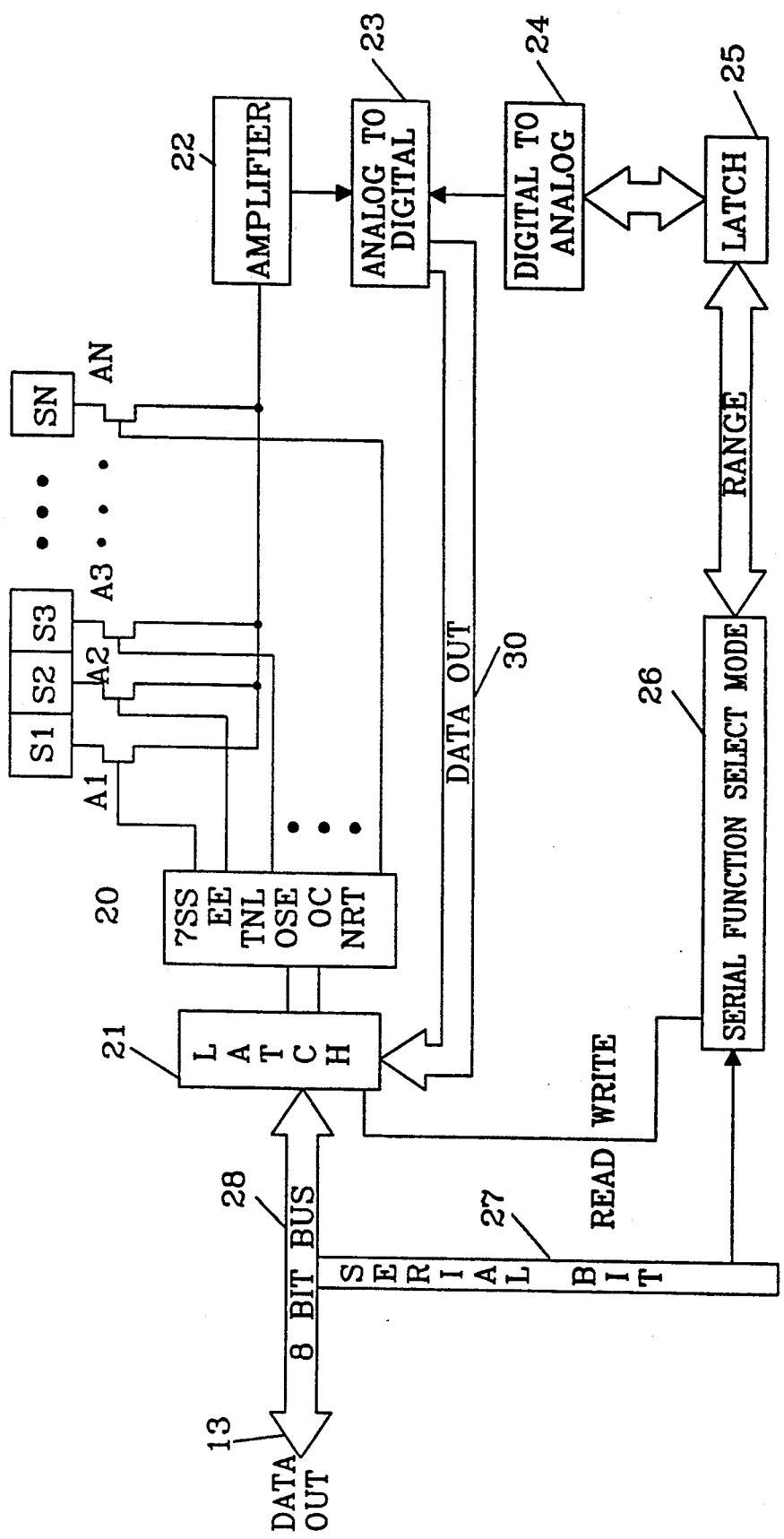
FIG. 2 is a block diagram of the system integrated with the sensor array.

FIG. 2 illustrates the system of the present invention and represents the functions that are integrated into the substrate of sensor array 10, FIG. 1. The blocks of elements identified as S1, S2, S3, . . . SN, represent the individual elements of the light sensor array 10. Each Light Sensor Element (LSE) S1 . . . SN is connected through, for example, a field effect transistor A1 . . . AN. A external microprocessor, or other computing system 20 via controller selects any one of the light sensor elements through a field effect transistor A1 . . . AN, and connects the output of the sensors S1 . . . SN to amplifier 22. Selection may be done in any order, depending upon the desired order as specified in the controller or external processor programming. Also, it is possible under some circumstances to connected multiple LSEs in parallel.

The analog signal from each LSE, which is proportional to the amount of light impinging upon the LSE, is presented to Analog-TO-Digital converter 23, to convert the analog signal to a digital form. The digital signal is directed to controller 20 via DATA OUT bus 30 in order for the controller to evaluate the light intensity impinging upon the selected LSE. Although the DATA BUS 30 is illustrated as a parallel bus, under some applications it may be desirable to use a serial bus.

Connected to the Analog-TO-Digital converter 23 is a Digital-To-Analog converter 24. Controller 20 is connected to Serial Function Select Mode circuit (SFSM) 26 via Latch 25. The input to SFSM 26 is from the 8 Bit Bus 28. 8 Bit Bus 28 is also connected to controller 20 through Latch 21. The function of SFSM circuit 26 is to activate the read/right functions (to select LSE and to direct output to the bus), and setting the upper and lower range of the Analog-To-Digital converter.

The system of FIG. 2 allows for microprocessor control of the sense function of array 10 so that by selecting sensor Sn, the light level of Pn (where n is an integer from 1 to N), can be measured and the data returned to the microprocessor.

FIGS. 3, 4 and 5, illustrated the arrangement of a sensor to be used in the detection of color. FIG. 3 represents an image that is to be scanned. FIG. 4 illustrates a sensor 41 that has each sensor area divided into three detectors 42,43 and 44.. The object is imaged via a lens (not illustrated) to a light sense element array consisting of N positions, each of which is split into three detectors. The three sections of the sensor are covered with color filters (red, green and blue) as illustrated in FIG. 5. Thus the color of position Pn can be determined by measurement of the relative intensities of red, blue and green.

The system of FIG. 2 can be integrated into a single sensor chip, and provides for direct addressing sensor regions, which permits precise use of those sensor regions of interest.

Color detection capability added to the position detection capability allows for not only position detection, but can be used for detection of color coded objects.

What is claimed:

1. An integrated multi-element sensor device, comprising:
    an array of light sensor elements for detecting light impinging thereon and for outputting a voltage representative of the impinging light intensity, each of the light sensing elements being individually addressable;
    a mode select circuit for activation of a select function to specify each light sensing element that is to be addressed;
    a controller circuit for selecting each light sensing element that is to be addressed; and
    an analog-to-digital converter for digitizing the amplitude of the output voltage of the selected light sensing element.

2. The integrated sensor device according to claim 1, including a digital-to-analog converter through which a digital signal from the mode select circuit is connected to the analog-to-digital circuit.

3. The integrated sensor device according to claim 1, wherein the mode select circuit sets the upper and lower range of the analog-to-digital converter.

4. The integrated sensor circuit according to claim 1, wherein each light sensing element is divided into three sensors for color detection.

5. The integrated light sensor element according to claim 4, wherein each of the three sensor elements divided from a sensing element is covered by a different color filter.

6. The integrated light sensor device according to claim 1, wherein each light sensing element is connected through a switch device to an amplifier.

7. The integrated light sensor device according to claim 6, wherein the switch device is a field effect transistor.

8. The integrated light sensor device according to claim 1, wherein each light sensing element is addressable in any order.

9. The integrated light sensor device according to claim 1, wherein the outputs from the light sensing elements are connected in parallel.

10. The integrated light sensor device according to claim 1, wherein the output from the device is digitized values of the light impinging on each light sensing element.

11. The integrated light sensor device according to claim 10, wherein the output of the digitized values is to a parallel bus.

12. The integrated light sensor device according to claim 10, wherein the output of the digitized values is to a serial bus.

13. The integrated sensor device according to claim 1, wherein the array of sensor elements are addressable by an external microprocessor.

14. An integrated multi-element sensor device, comprising:
    an array of light sensor elements for detecting light impinging thereon and for outputting a voltage representative of the impinging light intensity, each of the light sensing elements being individually addressable;
    a mode select circuit for activation of a select function to specify each light sensing element that is to be addressed;
    a controller circuit for selecting each light sensing element that is to be addressed; and
    a switch device associated with each light sensor element selectable by the controller circuit;
    an analog-to-digital converter for digitizing the amplitude of the output voltage of the selected light sensing element.

15. The integrated sensor device according to claim 14, including a digital-to-analog converter through which a digital signal from the mode select circuit is connected to the analog-to-digital circuit.

16. The integrated sensor device according to claim 14, wherein the mode select circuit sets the upper and lower range of the analog-to-digital converter.

17. The integrated sensor circuit according to claim 14, wherein each light sensing element is divided into three sensors for color detection.

18. The integrated light sensor element according to claim 17, wherein each of the three sensor elements divided form a sensing element is covered by a different color filter.

19. The integrated light sensor device according to claim 14, wherein each light sensing element is connected through said switch device to an amplifier.

20. The integrated light sensor device according to claim 19, wherein the switch device is a field effect transistor.

21. The integrated light sensor device according to claim 14, wherein each light sensing element is addressable in any order.

22. The integrated light sensor device according to claim 14, wherein the outputs from the light sensing elements are connected in parallel.

23. The integrated light sensor device according to claim 14, wherein the output from the device is digitized values of the light impinging on each light sensing element.

24. The integrated light sensor device according to claim 23, wherein the output of the digitized values is to a parallel bus.

25. The integrated light sensor device according to claim 23, wherein the output of the digitized values is to a serial bus.

26. The integrated sensor device according to claim 14, wherein the array of sensor elements are addressable by an external microprocessor.

* * * * *